US012659808B2

(12) United States Patent
Wu et al.

(10) Patent No.: US 12,659,808 B2
(45) Date of Patent: Jun. 16, 2026

(54) SIDELINK RESOURCE RESERVATION ENHANCEMENT

(71) Applicant: QUALCOMM Incorporated, San Diego, CA (US)

(72) Inventors: Shuanshuan Wu, San Diego, CA (US); Huilin Xu, Temecula, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 18/193,428

(22) Filed: Mar. 30, 2023

(65) Prior Publication Data

US 2024/0334255 A1     Oct. 3, 2024

(51) Int. Cl.
*H04W 28/26*     (2009.01)
*H04W 72/40*     (2023.01)
*H04W 92/18*     (2009.01)

(52) U.S. Cl.
CPC ........... *H04W 28/26* (2013.01); *H04W 72/40* (2023.01); *H04W 92/18* (2013.01)

(58) Field of Classification Search
CPC ..... H04W 28/26; H04W 72/40; H04W 92/18; H04W 72/25; H04W 72/02; H04W 72/0446
See application file for complete search history.

(56) References Cited

U.S. PATENT DOCUMENTS

2022/0030555 A1 *  1/2022  Chae ...................... H04L 5/0023
2023/0027895 A1 *  1/2023  Lin ...................... H04W 72/232

* cited by examiner

*Primary Examiner* — Rina C Pancholi
(74) *Attorney, Agent, or Firm* — Norton Rose Fulbright US LLP

(57)     ABSTRACT

This disclosure provides systems, methods, and apparatuses, including computer programs encoded on computer storage media, for wireless communication. In one aspect of the disclosure, a UE may transmit a sidelink resource reservation to one or more other UEs for reserving one or more frequency resources of each of a plurality of slots. The sidelink resource reservation may include an indication of a non-integer periodicity of the plurality of slots. The UE may then transmit information in one or more of the plurality of slots. Other aspects and features are also claimed and described.

28 Claims, 9 Drawing Sheets

700

702

Transmit, to a second UE, a sidelink resource reservation, including an indication of a non-integer periodicity of a plurality of slots, for reserving one or more frequency resources of each of the plurality of slots.

704

Transmit information in one or more of the plurality of slots.

700

702

Transmit, to a second UE, a sidelink resource reservation, including an indication of a non-integer periodicity of a plurality of slots, for reserving one or more frequency resources of each of the plurality of slots.

704

Transmit information in one or more of the plurality of slots.

800

802

Receive, from a second UE, a sidelink resource reservation, including an indication of a non-integer periodicity of a plurality of slots, for reserving one or more frequency resources of each of the plurality of slots.

804

Reserve one or more frequency resources of each of the plurality of slots for transmission of information by the second UE.

SIDELINK RESOURCE RESERVATION ENHANCEMENT

TECHNICAL FIELD

Aspects of the present disclosure relate generally to wireless communication systems, and more particularly, to sidelink resource reservation enhancements.

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

In addition to communication between UEs and base stations, wireless communication systems may facilitate sidelink communication between UEs. For example, via sidelink resources UEs may communicate directly with other UEs. Particular frequency resources may be reserved for such communication, and UEs may reserve frequency resources of particular slots for transmission of information to other UEs. Sidelink communication may be particularly useful in a variety of applications. For example, in edge computing applications, processing may be split between multiple UEs, and the multiple UEs may communicate using sidelink communication. As another example, in sensing applications sensing data may be collected by one UE, communicated via sidelink, and processed by another UE

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method for wireless communication performed by a user equipment (UE). The method includes transmitting, to a second UE, a sidelink resource reservation, including an indication of a non-integer periodicity of a plurality of slots, for reserving one or more frequency resources of each of the plurality of slots and transmitting information in one or more of the plurality of slots.

Another innovative aspect of the subject matter described in this disclosure can be implemented in a UE. The UE includes at least one processor and a memory coupled with the at least one processor and storing processor-readable instructions that, when executed by the at least one processor, is configured to transmit, to a second UE, a sidelink resource reservation, including an indication of a non-integer periodicity of a plurality of slots, for reserving one or more frequency resources of each of the plurality of slots and transmit information in one or more of the plurality of slots.

Another innovative aspect of the subject matter described in this disclosure can be implemented in an apparatus configured for wireless communication. The apparatus includes means for transmitting, to a second UE, a sidelink resource reservation, including an indication of a non-integer periodicity of a plurality of slots, for reserving one or more frequency resources of each of the plurality of slots and means for transmitting information in one or more of the plurality of slots.

Another innovative aspect of the subject matter described in this disclosure can be implemented in a non-transitory computer-readable medium storing instructions that, when executed by a processor, cause the processor to perform operations including transmitting, to a second UE, a sidelink resource reservation, including an indication of a non-integer periodicity of a plurality of slots, for reserving one or more frequency resources of each of the plurality of slots and transmitting information in one or more of the plurality of slots.

Another innovative aspect of the subject matter descried in this disclosure can be implemented in a method for wireless communication performed by a UE. The method includes receiving, from a second UE, a sidelink resource reservation, including an indication of a non-integer periodicity of a plurality of slots, for reserving one or more frequency resources of each of the plurality of slots and reserving one or more frequency resources of each of the plurality of slots for transmission of information by the second UE.

Another innovative aspect of the subject matter described in this disclosure can be implemented in a UE. The UE includes at least one processor and a memory coupled with the at least one processor and storing processor-readable code that, when executed by the at least one processor, is configured to receive, from a second UE, a sidelink resource reservation, including an indication of a non-integer periodicity of a plurality of slots, for reserving one or more frequency resources of each of the plurality of slots and reserve one or more frequency resources of each of the plurality of slots for transmission of information by the second UE.

Another innovative aspect of the subject matter described in this disclosure can be implemented in an apparatus configured for wireless communication. The apparatus includes means for receiving, from a second UE, a sidelink resource reservation, including an indication of a non-integer periodicity of a plurality of slots, for reserving one or more frequency resources of each of the plurality of slots and means for reserving one or more frequency resources of each of the plurality of slots for transmission of information by the second UE.

Another innovative aspect of the subject matter described in this disclosure can be implemented in a non-transitory computer-readable medium storing instructions that, when executed by a processor, cause the processor to perform operations including receiving, from a second UE, a sidelink resource reservation, including an indication of a non-integer periodicity of a plurality of slots, for reserving one or more frequency resources of each of the plurality of slots and reserving one or more frequency resources of each of the plurality of slots for transmission of information by the second UE.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
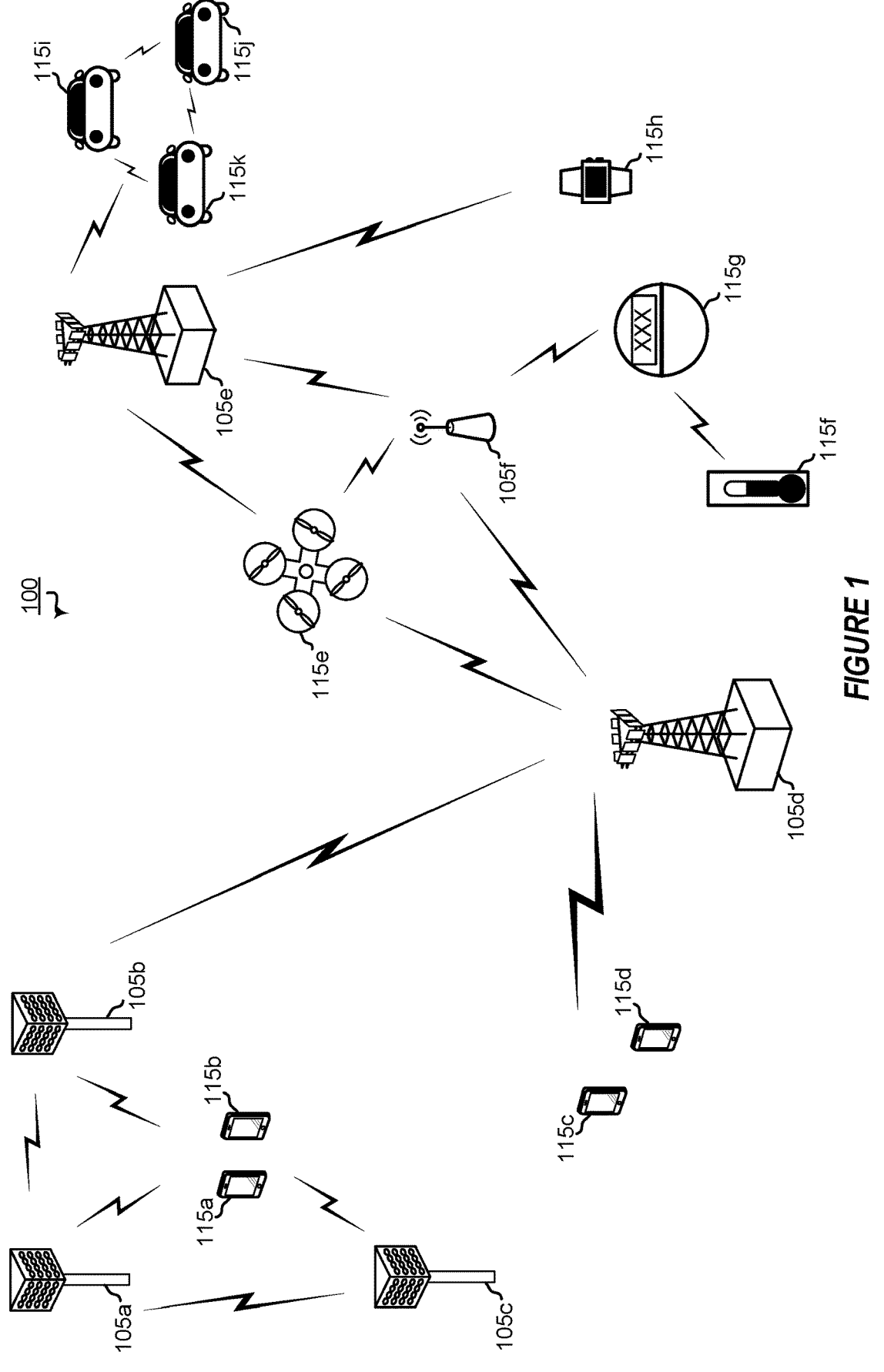
FIG. 1 is a block diagram illustrating details of an example wireless communication system according to one or more aspects.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The present disclosure provides systems, apparatus, methods, and computer-readable media for sidelink resource reservation enhancement. A UE may reserve sidelink frequency resources of a sequence of slots having a non-integer periodicity for transmission of sidelink information to one or more other UEs. Such reservation may be made through transmission of an indication of the non-integer periodicity, such as an index corresponding to the non-integer periodicity, an indication of a non-uniform time domain pattern of the sequence of slots, multiple indications of integer periodic reservations, an indication of a periodic integer reservation and multiple single slot reservations, or other indications, to one or more other UEs. The UE may then transmit information in the reserved sequence of slots. The one or more other UEs may use the indication of the non-integer periodicity to receive information transmitted by the UE in the reserved sequence of slots and/or as a basis for refraining from transmitting information in the reserved sequence of slots.

Particular implementations of the subject matter described in this disclosure can be implemented to realize one or more of the following potential advantages. In some aspects, the present disclosure provides flexibility to a UE in reserving sidelink communication resources of slots that do not fall into the rigid framework of an integer periodicity. Support for non-integer periodicities on sidelink channels may allow for efficient transmission of information formats that may be generated at rates that do not correspond to an integer periodicity of slots of a sidelink channel, such as video data, controller data, sensor data, audio data, and other kinds of data. As one particular example, support for non-integer periodicities may allow for sidelink transmission of video data at a periodicity corresponding to a framerate of the video data. Transmission at such periodicities may be particularly useful in augmented reality (AR) or virtual reality (VR) applications, referred to as XR applications, where support for non-integer periodicities in sidelink transmission may allow for transmission of video data from one or more environmental cameras or other sensors to an XR headset, a desktop personal computer, cellular phone, tablet, or other UE at a periodicity corresponding to a frame rate of the video data.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably. In some implementations, two or more wireless communications systems, also referred to as wireless communications networks, may be configured to provide or participate in authorized shared access between the two or more wireless communications systems.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km2), ultra-low complexity (such as ~10s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHZ, and the like bandwidth. For other various outdoor and small cell coverage deployments of TDD greater than 3 GHZ, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHZ, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (cMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115c, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105c.

Figure 2:
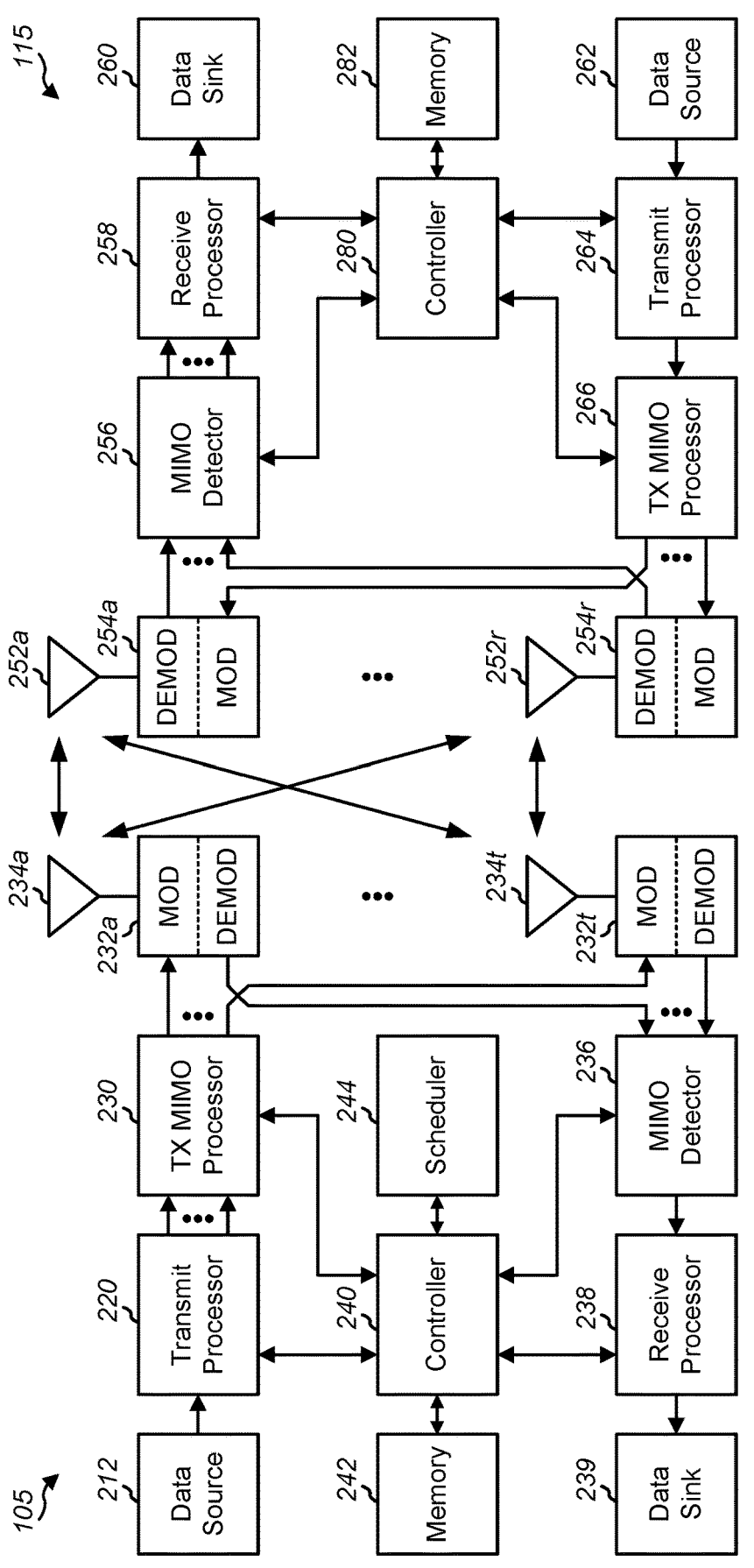
FIG. 2 is a block diagram illustrating examples of a base station and a user equipment (UE) according to one or more aspects.

FIG. 2 is a block diagram conceptually illustrating an example design of a base station 105 and a UE 115. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 7 and 8, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

Figure 3:
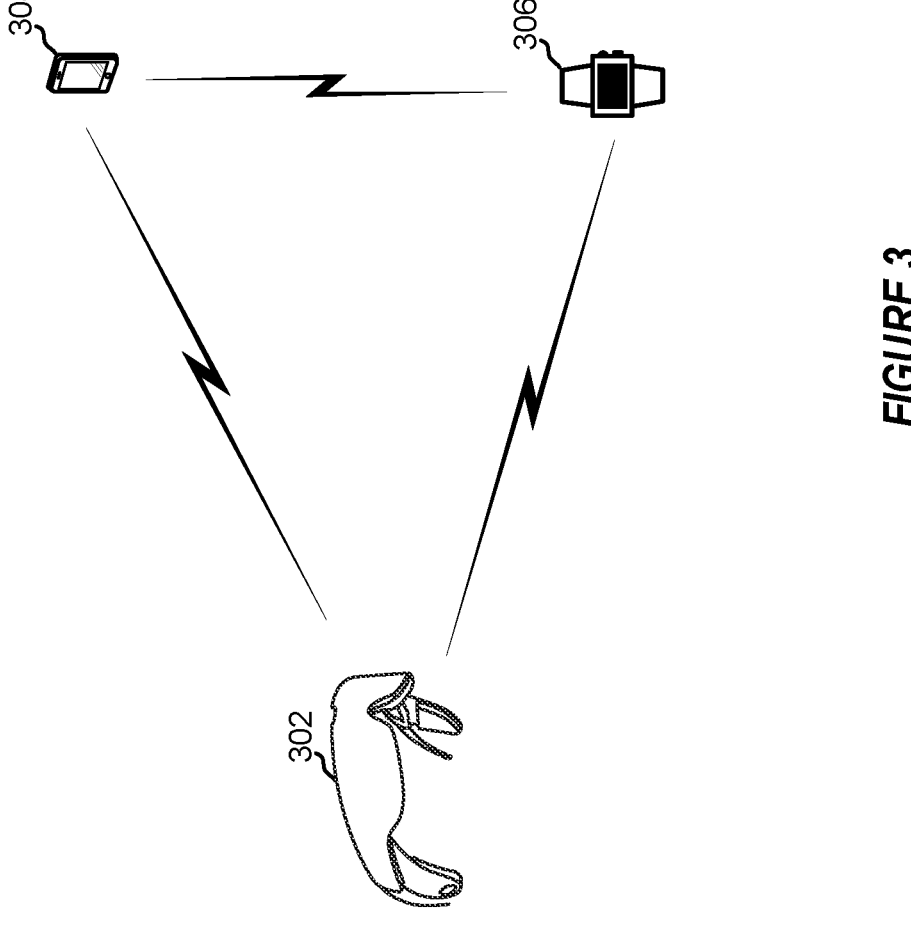
FIG. 3 is a block diagram illustrating an example wireless communication system that supports sidelink resource reservation enhancement according to one or more aspects.

FIG. 3 is a block diagram of an example wireless communications system 300 that supports sidelink resource reservation enhancement according to one or more aspects. The system 300 may include a plurality of UEs 302-306 which may communicate with one or more base stations, as discussed with respect to FIGS. 1 and 2, and/or with each other via sidelink communications. A first UE 302 may include an AR or VR (XR) headset, a second UE 304 may include a mobile phone, and a third UE 306 may include a wearable device such as a smart watch. In some embodiments other kinds of UEs may be included in the system 300 such as laptop computers, desktop computers, tablet devices, handheld controllers, cameras, other XR devices, sensors, and other UEs. For example, in some embodiments, the second UE 304 and the third UE 306 may comprise cameras for collecting data regarding an environment of the UEs 302-306 and movement and positioning of the UE 302.

The first UE 302, second UE 304, and third UE 306 may directly communicate with each other via one or more frequency resources reserved for sidelink communications. Such frequency resources may be divided into time domain slots for reservation by the UEs 302-306. For example, a time-domain slot may include multiple frequency resources, including frequency resources reserved for sidelink communication. As one particular example, each slot may have a length of 1 ms, although other slot lengths may be used. Thus, for example, the first UE 302 may reserve slots at a first periodicity, such as at a periodicity of 100 ms, for transmission of information to the second UE 304. In reserving slots with such a periodicity, the first UE 302 may reserve sidelink frequency resources of every hundredth slot. The first UE 302 may broadcast a reservation for such slots to other UEs, such as the second UE 304 and the third UE 306, so that the second UE 304 and the third UE 306 will not transmit information on the reserved frequency resources in the reserved slots. Such resources may, for example, be reserved through transmission of sidelink control information.

Some information formats may benefit from transmission at non-integer periodicities, such as periodicities that don't correspond to slot timing. A non-integer periodicity is a periodicity that may not align with slot timing. Thus, for example, a periodicity of 33.33 ms with a slot length of 1 ms or 0.5 ms may be a non-integer periodicity. As one particular example, XR applications may include sidelink transmission of data that would benefit from transmission at non-integer periodicities. For example, some XR devices may communicate with one or more external sensors via sidelink resources to obtain three dimensional information about the XR devices and the spatial structure of the environment in which they are being used. As one example, a first UE 302 may be an XR headset and a second UE 304 may be a smartphone. An XR headset 302 may communicate with a second UE 304, such as a smartphone, using one or more sidelink resources. For example, the second UE 304, such as a smartphone, may transmit video or other content to be displayed on one or more displays of the XR headset 302 via one or more sidelink resources.

As another example, an XR headset 302 may communicate with one or more cameras to aggregate video data for simultaneous localization and mapping (SLAM) to build a three-dimensional map of an environment in which the XR headset 302 is used. Thus, the first UE 302 may be an XR headset, and the second UE 304 and third UE 306 may be cameras in communication with the XR headset 302. The first and second UEs 304 and 306 may transmit video data to the XR headset 302 to allow the XR headset 302 to generate SLAM data. The video data may be generated by the first and second UEs 304 and 306 may be generated at a constant rate, such as a frame rate of the cameras.

For video transmission over one or more sidelink resources, one data packet, such as one internet protocol (IP) packet, may be generated for each frame. Thus packet generation may have a same periodicity as video frame generation, such as a 1000/30 ms packet generation periodicity for video recorded at 30 frames per second. Example frame rates may include 30 frames per second, 60 frames per second, 240 frames per second, or another frame rate. Facilitating sidelink transmission of video data to the XR headset 302, whether from a smartphone, one or more cameras, or one or more other UEs, at the rate at which the video data is generated may allow for more efficient and reliable transmission of such video data. For example, generation of video data at a frame rate of 30 frames per second may correspond to a periodicity of 33.3 ms, generation of video data at a frame rate of 60 frames per second may correspond to transmission of data at a periodicity of 16.6 ms, and generation of video data at a rate of 240 frames per second may correspond to transmission of data at a periodicity of 4.16 ms. Thus, instead of reserving sidelink resources of slots at an integer periodicity, such as one frame every 33 ms, or one frame every 50 ms, a UE transmitting data, such as video data, may reserve sidelink resources at a non-integer periodicity corresponding to a rate at which the UE generates the data to be transmitted. Such reservation may, for example, include rounding of a frame count or periodicity to select one or more frames at the non-integer periodicity. Thus, when frames are reserved according to a non-integer periodicity, a number of frames between reserved frames may vary, rather than remaining constant as when frames are selected according to an integer periodicity.

Figure 4:
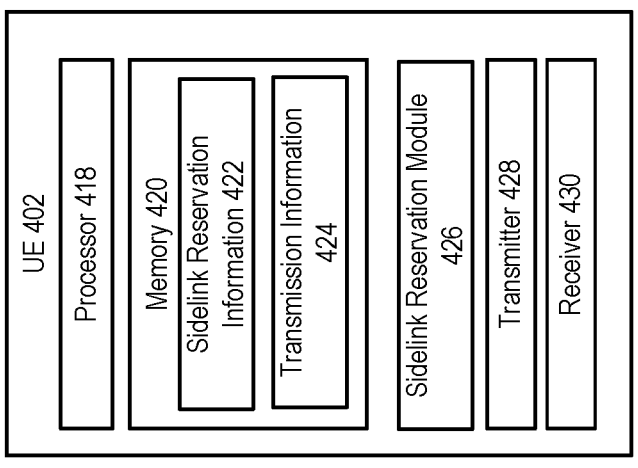
FIG. 4 is a block diagram illustrating an example wireless communication system that supports sidelink resource reservation enhancement according to one or more aspects.
Figure 4:
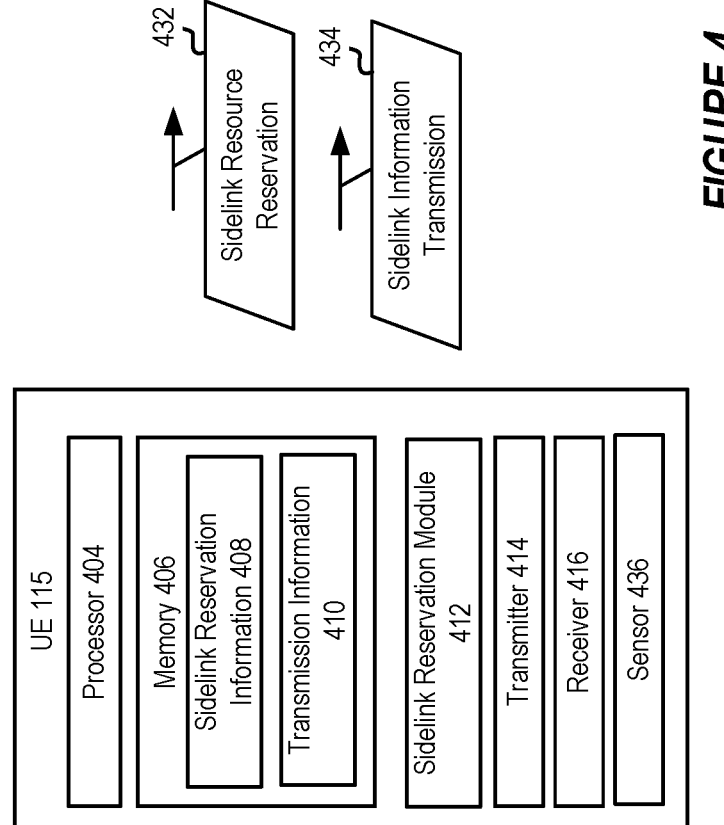

FIG. 4 is a block diagram of an example wireless communications system 400 that supports sidelink resource reservation enhancement according to one or more aspects. In some examples, the wireless communications system 400 may implement aspects of the wireless network 100. The wireless communications system 400 includes the UE 115 and the UE 402. The UE 402 may correspond to another of UEs 115 of FIG. 1. Although one UE 115 and one UE 402 are illustrated, in some other implementations, the wireless communications system 400 may generally include multiple UEs, and may include one or more base stations.

The UE 115 can include a variety of components (such as structural, hardware components) used for carrying out one or more functions described herein. For example, these components can include one or more processors 404 (hereinafter referred to collectively as "the processor 404"), one or more memory devices 406 (hereinafter referred to collectively as "the memory 406"), one or more transmitters 414 (hereinafter referred to collectively as "the transmitter 414"), and one or more receivers 416 (hereinafter referred to collectively as "the receiver 416"). The processor 404 may be configured to execute instructions stored in the memory 406 to perform the operations described herein. In some implementations, the processor 404 includes or corresponds to one or more of the receive processor 258, the transmit processor 264, and the controller 280, and the memory 406 includes or corresponds to the memory 282. In some embodiments, the UE 115 may include a sensor 436 for generating sensed environment data. For example, the sensor 436 may include a camera for generating video data for transmission to the UE 402. The UE 115 may, for example, include a camera for generating video data for use by the UE 402, which may include an XR device, in mapping an environment of the UEs 115 and 402.

The memory 406 includes or is configured to store sidelink reservation information 408 and transmission information 410. Sidelink reservation information 408 may, for example, include information regarding periodicities for reservation of slots for sidelink information transmission by the UE 115. For example, sidelink reservation information 408 may include information regarding one or more non-integer periodicities for reservation of sidelink resources by the UE 115. Sidelink reservation information may include a slot length of the sidelink resources, a frequency band allocated for sidelink communications, timing information of slots, information indicating indexes corresponding to non-integer and/or integer periodicities, and other sidelink information. In some embodiments, sidelink reservation information may include information indicating one or more slots reserved for sidelink transmission by the UE 115 or another UE. Transmission information 410 may include information for transmission on a sidelink channel, such as information generated by one or more sensors 436 of the UE 115. Transmission information 410 may, for example, include video information, audio information, control input information, proximity information, and other information generated by the UE 115. In some embodiments, the UE 115 may delete transmission information 410 after such information is transmitted to UE 402 or another UE on one or more sidelink resources.

The transmitter 414 is configured to transmit reference signals, control information and data to one or more other devices, and the receiver 416 is configured to receive references signals, synchronization signals, control information and data from one or more other devices. For example, the transmitter 414 may transmit signaling, control information and data to, and the receiver 416 may receive signaling, control information and data from, the UE 402. In some implementations, the transmitter 414 and the receiver 416 may be integrated in one or more transceivers. Additionally or alternatively, the transmitter 414 or the receiver 416 may include or correspond to one or more components of the UE 115 described with reference to FIG. 2.

Sensor 436 may include one or more sensors of the UE 115 for generation of information for transmission to the UE 402 on one or more sidelink resources. For example, sensor 436 may include an image sensor, for generation of image or video data, an audio sensor, for generation of audio data, input sensors, for generation of data based on input by a user, and other sensors. Sidelink reservation module 412 may include instructions for causing the UE 115 to reserve one or more sidelink resources for transmission of information to one or more other UEs, such as UE 402. The sidelink reservation module 412 may include instructions for reserving sidelink frequency resources of one or more slots having a non-integer periodicity. For example, sidelink reservation module 412 may include instructions for causing the UE 115 to reserve resources of one or more slots having a non-integer periodicity based on a rate at which information is generated by sensor 436, such as based on a frame rate of video information to be transmitted. In some embodiments, the sidelink reservation module 412 may include logic for determining slots reserved according to a periodicity determined by the UE 115, such as one or more rounding rules for determining whether to round a reserved slot number or time up, down, or to a nearest integer.

The UE 402 can include a variety of components (such as structural, hardware components) used for carrying out one or more functions described herein. For example, these components can include one or more processors 418 (hereinafter referred to collectively as "the processor 418"), one or more memory devices 420 (hereinafter referred to collectively as "the memory 420"), one or more transmitters 428 (hereinafter referred to collectively as "the transmitter 428"), and one or more receivers 430 (hereinafter referred to collectively as "the receiver 430"). The processor 418 may be configured to execute instructions stored in the memory 420 to perform the operations described herein. In some implementations, the processor 418 includes or corresponds to one or more of the receive processor 258, the transmit processor 264, and the controller 280, and the memory 406 includes or corresponds to the memory 282.

The memory 420 includes or is configured to store sidelink reservation information 422 and transmission information 424. Sidelink reservation information 422 may, for example, include sidelink reservation information received from UE 115, another UE, or sidelink reservation information generated by UE 402. For example, sidelink reservation information 422 may include information indicating one or more resources of one or more slots reserved by UE 115 for transmission of information. In some embodiments, sidelink reservation information 422 may include information indicating a non-integer periodicity of slots having resources reserved by the UE 115 for sidelink transmission by the UE 115. Transmission information 424 may, for example, include transmission information transmitted on sidelink resources by the UE 115 or other UEs. In some embodiments transmission information 424 may include information generated by UE 402 for sidelink transmission to UE 115 or other UEs.

The transmitter 428 is configured to transmit reference signals, synchronization signals, control information and data to one or more other devices, and the receiver 430 is configured to receive reference signals, control information and data from one or more other devices. For example, the transmitter 428 may transmit signaling, control information and data to, and the receiver 430 may receive signaling, control information and data from, the UE 115. In some implementations, the transmitter 428 and the receiver 430 may be integrated in one or more transceivers. Additionally or alternatively, the transmitter 428 or the receiver 430 may include or correspond to one or more components of UE 115 described with reference to FIG. 2.

Sidelink reservation module 426 may include instructions for causing the UE 402 to receive reservations for one or more sidelink resources for transmission of information by another UE, such as UE 115. The sidelink reservation module 426 may include instructions for detecting reservation of sidelink frequency resources of one or more slots having a non-integer periodicity. For example, sidelink reservation module 426 may include instructions for causing the UE 402 to receive reservations of resources of one or more slots having a non-integer periodicity based on a rate at which data is generated by another UE, such as UE 115, such as based on a frame rate of video information to be transmitted. Sidelink reservation module 426 may, for example, include instructions to cause the UE 402 to refrain from transmitting information on one or more sidelink resources, such as one or more sidelink frequency resources, during slots reserved by a sidelink resource reservation received from the UE 115 or from another UE. In some embodiments, the sidelink reservation module 426 may include logic for determining slots reserved according to a periodicity indicated by the UE 115, such as one or more rounding rules for determining whether to round a reserved slot number or time up, down, or to a nearest integer. Such rules may, for example, correspond to rules configured in the sidelink reservation module 412, so that both the transmitting UE 115 and the receiving UE 402 will determine the same reserved slots based on a non-integer periodicity. In some embodiments, the UE 402 may also include sensors similar to or different from the sensor 436 of UE 115.

In some implementations, the wireless communications system 400 implements a 5G New Radio (NR) network. For example, the wireless communications system 400 may include multiple 5G-capable UEs 115 and multiple 5G-capable base stations 105, such as UEs and base stations configured to operate in accordance with a 5G NR network protocol such as that defined by the 3GPP. In some embodiments, the wireless communication system 400 may include multiple UEs, such as UE 115, UE 402, and other UEs which may communicate with each other via sidelink resources, such as one or more sidelink channels.

During operation of the wireless communications system 400, The UE 115 may generate transmission information 410 for transmission to UE 402. The UE 115 may determine a periodicity for transmission of information to the UE 402 via one or more sidelink resources, such as one or more frequency resources reserved for sidelink transmission. In some embodiments, information may be generated by the UE 115 for transmission at a rate that differs from a periodicity of slots of the sidelink resources. The UE 115 may reserve resources of one or more slots for transmission of sidelink information to UE 402 or another UE by transmission of a sidelink resource reservation 432. The sidelink resource reservation 432 may, for example, be broadcast to multiple UEs, such as UE 402, to prevent the UEs from transmitting on one or more resources of a plurality of slots reserved by the UE 115. The sidelink resource reservation 432 may include sidelink reservation information 408, such as information indicating a non-integer periodicity of slots reserved by the UE 115. The UE 402, and other UEs, may receive the sidelink resource reservation and may determine a plurality of slots that the UE 115 has reserved for transmission of sidelink information on sidelink resources in accordance with the sidelink resource reservation. For example, the UE 402 may determine a plurality of slots having a non-integer periodicity in accordance with a non-integer periodicity indicated by the sidelink resource reservation 432. The UE 402 may reserve such slots for transmission by the UE 115. For example, the UE 402 may refrain from transmitting on sidelink resources during the slots reserved by the UE 115.

The UE 115 may then transmit a sidelink information transmission 434 to the UE 402 or another UE. The sidelink information transmission 434 may include transmission information 410. For example, the UE 115 may include a camera for collecting video data, and the sidelink information transmission 434 may include video data transmitted from the UE 115 to the UE 402. The sidelink resource reservation 432 may, for example, include a reservation of slots having a non-integer periodicity corresponding to a frame rate of the video data. In some embodiments, the UE 402 may receive the sidelink information transmission 434. In some embodiments, a sidelink information transmission 434 may be transmitted along with a sidelink resource reservation 432 in a slot in which the sidelink resource reservation is transmitted. Thus, the UE 115 may reserve sidelink resources of a plurality of slots having a non-integer periodicity for transmission of sidelink information, and the UE 402 may refrain from transmitting on sidelink resources during the slots reserved by the UE 115.

As described with reference to FIG. 4, the present disclosure provides techniques for transmission of sidelink information at non-integer periodicities. Such transmission may allow for transmission of information generated at rates that don't correspond to equidistant slots, such as transmission of video information at rates corresponding to a frame rate of the video information.

Figure 5:
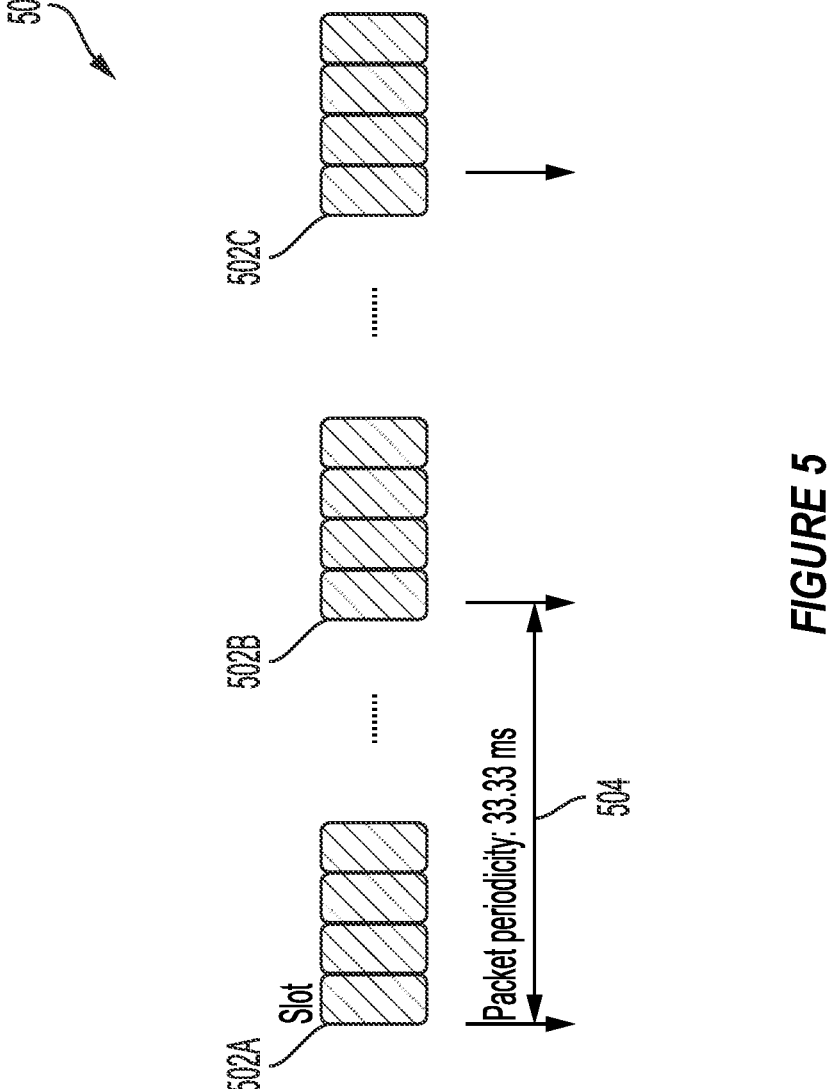
FIG. 5 is a timing diagram illustrating a non-integer packet periodicity according to one or more aspects.

FIG. 5 is a timing diagram of transmission at slots having a non-integer periodicity. At a first slot 502A, a sidelink resource reservation may be transmitted by a UE including an indication of a non-integer periodicity of slots at which information is to be transmitted. A non-integer periodicity may include a periodicity not corresponding to starting points of time domain slots. Use of such a periodicity may be accommodated by reserving slots that are not equally spaced, according to the non-integer periodicity, by rounding either times for slot reservations or reserved slot numbers up based on the non-integer periodicity. As one example, a slot length may be 1 ms, and a non-integer packet periodicity 504 may be 33.33 ms. Thus, a 33rd slot may begin at 33 ms, but a time or slot number for reservation indicated by the non-integer periodicity may not begin until 33.33 ms or 33.33 slots. To accommodate such non-integer periodicities, a UE may be configured to round reserved slot numbers or times to a nearest integer slot number or time. In particular, times reserved for transmission based on a non-integer periodicity in time may be mapped to discrete slots. Thus, to accommodate the non-integer packet periodicity 504, slots 502B and 502C may be reserved for transmission by the UE.

As one example, a sidelink resource indication may indicate the non-integer periodicity of 504, such as through inclusion of an index corresponding to the non-integer periodicity 504. For example, the transmitting UE and the receiving UE may both store a table indicating correspondence between a plurality of index values and a plurality of periodicities, such as integer and non-integer periodicities. A transmitting UE and a receiving UE may both determine that slot 502B, the 33rd slot is reserved according to the non-integer periodicity of 33.33 ms, and that slot 502C, the 67th slot, is reserved according to the non-integer periodicity. A subsequent reserved slot may be a 100th slot. For example, in determining slots corresponding to the non-integer periodicity, the reserved slot numbers may be rounded according to a rule. For example, the slot numbers may be rounded up, rounded down, or rounded to a nearest integer. As another example, the timing for reserved slots may be rounded up, down, or to a nearest integer.

In some embodiments, a wireless network may support multiple numerologies. For example, a subcarrier spacing (SCS) of 15 kHz, 30 kHZ, 60 kHz, or another SCS may be supported. For a SCS of 15 kHz, a slot length may be 1 ms, for a SCS of 30 kHz, a slot length may be 0.5 ms, and for a SCS of 60 kHz, a slot length may be 0.25 ms. Reserved slots may depend on a numerology in addition to the non-integer periodicity. A non-integer periodicity may thus be a periodicity that does not align with slot timing boundaries. For example, if a slot length is 0.5 ms, a periodicity of 30.5 ms may be an integer periodicity, as times reserved according to the periodicity may align with slot boundaries. If a slot length is 1 ms, a periodicity of 30.5 ms may be a non-integer periodicity, as times reserved according to the periodicity may not align with slot boundaries. As another example, with an SCS of 30 kHz, a slot length of 0.5 ms, and a non-integer periodicity 504 of 33.33 ms, the slot 502B may be rounded to a 67th slot, and the slot 502C may be rounded to the 133rd slot.

In some embodiments, a transmitting UE and a receiving UE may be configured to round a packet periodicity in seconds, or packet number to determine slots reserved by sidelink resource reservation transmission. For example, if a transmitting UE transmits a sidelink resource reservation for a periodicity of 33.33 ms and a slot length of 0.5 ms, the transmitting UE and the receiving UE may round the periodicity in time to determine the reserved slots, such as a slot at 0 ms, a slot at 33 ms, which may be a 66th slot, a slot at 67 ms, which may be a 134th slot, and a slot at 100 ms, which may be a 200th slot. As another example, the transmitting UE and the receiving UE may round the slot numbers selected by the periodicity, such as a 67th slot, a 133rd slot and a 200th slot. Thus, the transmitting UE and the receiving UE may be configured to round in the same way, to facilitate reservation of the same slots by the transmitting UE and the receiving UE.

In some embodiments, a sidelink resource reservation transmitted at slot 502A may be missed by one or more UEs to which the reservation is transmitted. For example, a receiving UE may miss a transmission of a sidelink resource reservation and/or sidelink information in a slot due to low signal to noise ratio (SNR), transmission by the receiving UE during the time the sidelink resource reservation was transmitted, or other factors. Thus, if a sidelink resource reservation only includes an indication of a non-integer periodicity of sidelink transmissions, a receiving UE may not be aware of where in a pattern of reserved slots the received sidelink resource reservation is located. For example, with a SCS of 15 kHz, a slot length of 1 ms, and a periodicity of 33.33 ms, if a first transmission of a reservation is missed at 502A and a second transmission of the reservation is received at 502B, the receiving UE may think that a next reserved slot at 502C is 33 slots after the transmission of the reservation at 502B, rather than 34 slots after the transmission of the reservation at 502B. That is, the receiving UE may not be aware of where in the 33, 34, 33 repeating pattern the slot 502B is located. Thus an offset indication indicating a position of the slot at which the sidelink resource reservation is received in a pattern of slots associated with the non-integer periodicity may be included in the sidelink resource reservation. For example, a slot length of 1 ms and a periodicity of 33.33 ms may be associated with a repeating pattern of 33, 34, 33 slots from one reserved slot to a next reserved slot. An index of 0 may indicate that the slot is a first slot in the pattern and that a next slot is 33 slots after the slot, an index of 1 may indicate that the slot is a second slot in the pattern, and that the next reserved slot is 34 slots after the reserved slot, and an index of 2 may indicate that the slot is a third slot in the pattern, and that the next reserved slot is 33 slots after the reserved slot. For example, two bits of a sidelink resource reservation may indicate a position of a slot within a repeating pattern of slot offsets associated with the non-integer periodicity. Thus, receiving UEs and transmitting UEs may maintain alignment in reservation of slots using non-integer periodicities.

As another example of information indicating a non-integer periodicity, an indication of a non-uniform time-domain pattern may be transmitted in the sidelink resource reservation at slot 502A. For example, a transmitting UE and a receiving UE may both store corresponding tables of indexes corresponding to patterns of reserved slots associated with non-integer periodicities and slot lengths. For example, a first index may correspond to a pattern of 33, 34, 33 ms slot spacings associated with a periodicity of 33.33 ms and a slot length of 1 ms. Likewise, a second index may correspond to a pattern of 16, 17, 17 ms slot spacings associated with a periodicity of 16.66 ms and a slot length of 1 ms. Likewise, a third index may correspond to a pattern of 67, 66, 67 ms slot spacings, associated with a periodicity of 33.33 ms and a slot length of 0.5 ms. An indication of the position in the pattern at which the sidelink resource reservation may also be transmitted along with the indication of the time domain pattern, as described herein. In some embodiments, sidelink resource reservations may be transmitted at each reserved slot, such as at each of the slots 502A-C. In some embodiments, sidelink information, such as video or other sensed information, may be transmitted along with sidelink resource reservations at each of the slots 502A-C.

Figure 6:
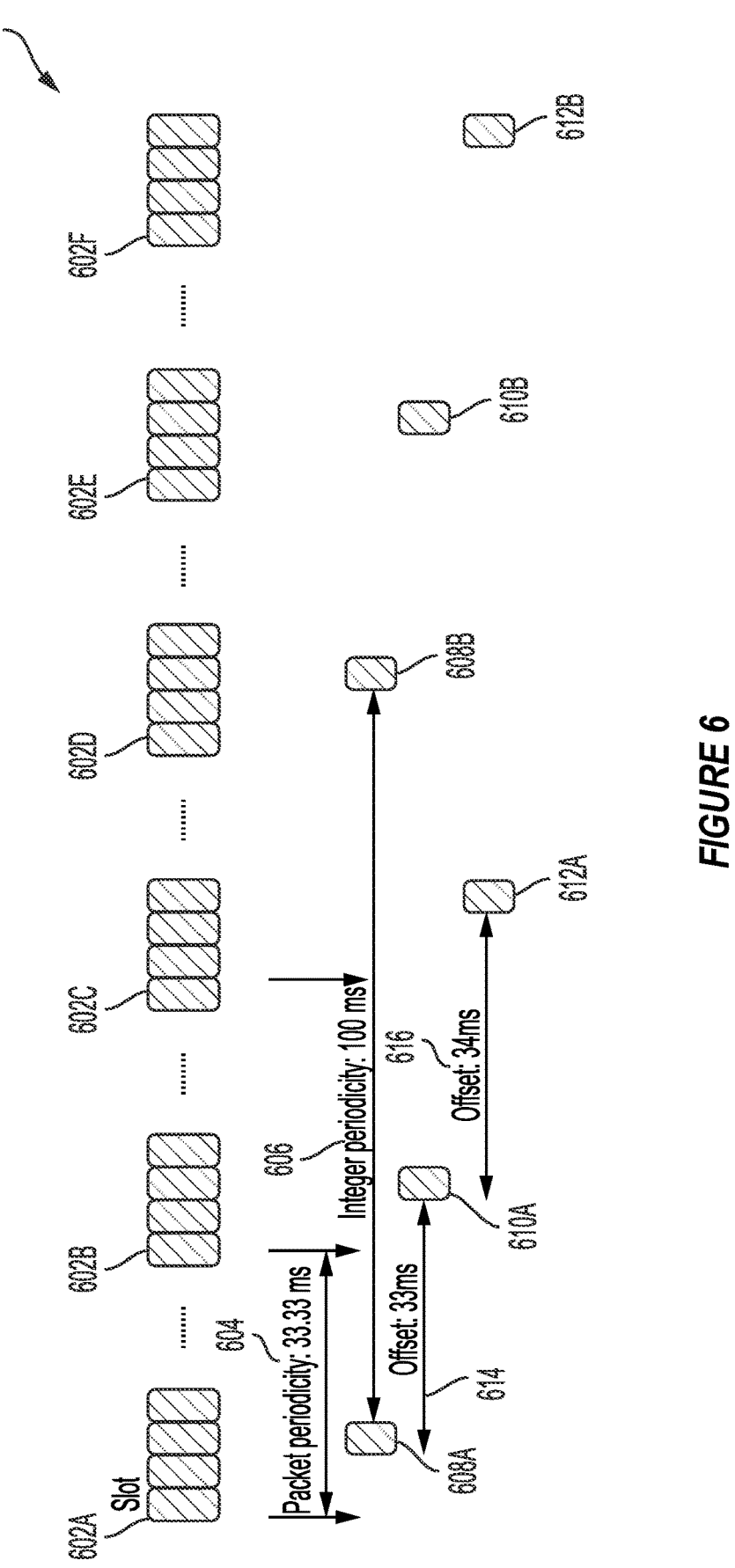
FIG. 6 is a timing diagram illustrating integer packet periodicities and non-integer packet periodicities according to one or more aspects.

In some embodiments, an indication of a non-integer periodicity transmitted in a slot may include an indication of multiple integer periodicities associated with the non-integer periodicity. For example, as shown in timing diagram 600 of FIG. 6, a plurality of slots may include a first slot 602A, a second slot 602B, a third slot 602C, a fourth slot 602D, a fifth slot 602E, and a sixth slot 602F corresponding to a non-integer periodicity of 33.33 ms. As discussed herein, a transmitting UE may reserve a plurality of slots having a non-integer packet periodicity 604, such as a packet periodicity of 33.33 ms. To reserve such slots, the transmitting UE may transmit a sidelink resource reservation including an indication of multiple integer periodicities associated with the non-integer periodicity. In some embodiments, the transmitting UE may transmit multiple sidelink resource reservations including indications of one or more of the integer periodicities associated with the non-integer periodicity. For example, a UE may transmit a first indication of a first integer periodicity of 100 ms associated with the non-integer periodicity of 33.33 ms at a first reserved slot 608A. The first reserved slot 608A may correspond to first slot 602A. Such a reservation may reserve a second reserved slot 608B separated from the first reserved slot 608A by the integer periodicity 100 ms. The second reserved slot 608B may correspond to fourth slot 602D. Likewise, the UE may transmit a second indication of a second integer periodicity of 100 ms associated with the non-integer periodicity of 33.33 ms at a third reserved slot 610A. The third reserved slot 610A may correspond to the second slot 602B. The third reserved slot 610A may be offset from the first reserved slot 608A by a number of slots or a time period offset 614 associated with the non-integer periodicity, such as a 33 ms offset. The second indication of the second integer periodicity of 100 ms may reserve slots at the 100 ms interval following the third reserved slot 610A, such as fourth reserved slot 610B. The fourth reserved slot 610B may correspond to the fifth slot 602E. Likewise, the UE may transmit a third indication of a third integer periodicity of 100 ms associated with the non-integer periodicity of 33.33 ms at a fifth reserved slot 612A. The fifth reserved slot 612A may correspond to the third slot 602C. The fifth reserved slot 612A may be offset from the third reserved slot 610A by a number of slots or a time period offset 616 associated with the non-integer periodicity, such as a 34 ms offset. The third indication of the third integer periodicity of 100 ms may reserve slots at the 100 ms interval following the fifth reserved slot 612A, such as sixth reserved slot 612B. The sixth reserved slot 612B may correspond to the sixth slot 602F. The combined sidelink resource reservations transmitted at slots 608A, 610A, and 612A, with the indications of the integer periodicity 606 may reserve slots in a pattern associated with the non-integer periodicity of 33.33 ms, as the slots of the integer sidelink resource reservations are themselves spaced according to the non-integer periodicity. In some embodiments, a transmitting UE may perform resource selection according to a non-integer periodicity to reserve resources in a spacing that is roughly uniform, while in other embodiments spacing between integer sidelink resource reservations may be configured by a network or base station, such as configuration of a UE to transmit channel resource reservations associated with a non-integer periodicity having indications of integer periodicities in a 33, 34, 33 ms interval.

In some embodiments, an indication of a non-integer periodicity transmitted by in a sidelink resource reservation may include an indication of an integer periodicity and an indication of one or more individual slots associated with a non-integer periodicity. For example, a sidelink resource reservation transmitted at slot 608A may include an indication of a 100 ms periodicity, to reserve slots at a 100 ms periodicity, an indication of slot 610A, and an indication of slot 612A to reserve slots associated with the packet periodicity of 33.33 ms. Thus, in a sidelink control information transmission, a transmitting UE may indicate an integer periodicity and one or more additional transmission indications, such as one or more additional slots, reserved by the transmitting UE. In some embodiments, a time location of the additional may be indicated by the transmitting UE in the sidelink resource reservation, such as through inclusion of interval values, such as absolute interval values between the slot at which the reservation is transmitted and the two additional slots or through inclusion of an index associated with each of the intervals.

As another example, the sidelink resource reservation may include an indication of the integer periodicity and an indication of a number of additional slots associated with a non-integer periodicity. The receiving UE may then determine the additional slots based on the number of additional slots and the indication of the integer periodicity. For example, if a slot length is 1 ms, if an integer periodicity of 100 ms is indicated, and if two additional slots are indicated, the receiving UE may determine that the two additional reservations should be at 33 ms and 67 ms. Sidelink control information, such as a sidelink reservation indication, transmitted at the additional slots may include an indication of the integer periodicity, while in some embodiments an indication of the integer periodicity may only be transmitted at slots of the integer periodicity. Sidelink control information, such as a sidelink reservation indication, transmitted at the additional slots may include indications of one or more additional slots, while in some embodiments, indications of the additional slots may not be transmitted at the additional slots.

Figure 7:
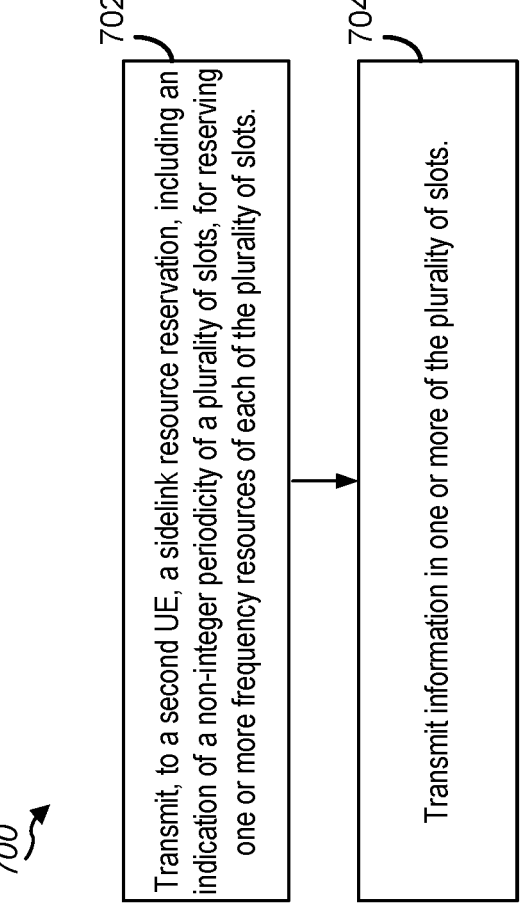
FIG. 7 is a flow diagram illustrating an example process that supports sidelink resource reservation enhancement according to one or more aspects.

FIG. 7 is a flow diagram illustrating an example process 400 that supports sidelink resource reservation enhancement according to one or more aspects. Operations of the process 700 may be performed by a UE, such as the UE 115 described above with reference to FIGS. 1-2 and 4 or a UE as described with reference to FIG. 9. The UE may, for example, be a transmitting UE, as described herein, such as a camera or other UE gathering information for XR applications. Example operations (also referred to as "blocks") of the process 700 may enable the UE 115 to support sidelink resource reservation enhancement, such as reservation of sidelink resources having a non-integer periodicity.

In block 702, the UE 115 transmits, to a second UE, a sidelink resource reservation, including an indication of a non-integer periodicity of a plurality of slots, for reserving one or more frequency resources of each of a plurality of slots. For example, one or more frequency resources may be reserved for sidelink communication. Frequency resources may be divided into time domain slots, such as based on a numerology as described herein. The sidelink resource reservation may, for example, be included in sidelink control information transmitted by the UE to one or more other UEs. In some embodiments, the sidelink resource reservation may include multiple sidelink resource reservation transmissions. As one example, the indication of the non-integer periodicity may include an index corresponding to the non-integer periodicity. As another example, the indication of the non-integer periodicity may include an indication of a non-uniform time domain pattern of the plurality of slots. For example, the indication may include an indication of a time or slot offset of the plurality of slots according to the non-integer periodicity, such as a pattern of 33, 34, 33 ms. In particular, the non-uniform time domain pattern of the plurality of slots may include an indication of a time duration between a first slot and a second slot, such as a second reserved slot in time, of the plurality of slots or an indication of a number of sequential slots between the first slot and the second slot. In some embodiments, the indication of the non-uniform time domain pattern of the plurality of slots may include an index corresponding to the non-uniform time domain pattern of the plurality of slots. The pattern may be non-uniform in that a time between reserved slots may not be constant, and the pattern may be time domain in that the pattern may identify a time offset of a reserved slot from a previous reserved slot. In some embodiments, the indication of the non-integer periodicity may include a first integer periodic reservation associated with the non-integer periodicity and a second integer periodic reservation associated with the non-integer periodicity. In some embodiments, the indication of the non-integer periodicity may include more than two periodic reservations associated with the non-integer periodicity. In some embodiments, the integer periodic reservations of the sidelink resource reservation may be transmitted at different slots associated with the non-integer periodicity. When slots are reserved according to the multiple integer periodicities, the reserved slots, together, may form a set of slots spaced according to the non-integer periodicity. In some embodiments, the indication of the non-integer periodicity may include a first integer periodic reservation and a first individual slot reservation which may both be associated with the non-integer periodicity. In some embodiments, two or more individual slot reservations may be included in the indication of the non-integer periodicity. When slots are reserved according to the integer periodicity and the individual slot reservations, the reserved slots, together, may form a set of slots spaced according to the non-integer periodicity. In some embodiments, the sidelink resource reservation may include a slot offset indication indicating a position of a first slot in which the sidelink resource reservation is transmitted in a pattern of the plurality of slots, as discussed herein.

In block 704, the UE 115 may transmit information in one or more of the plurality of slots. Such information may, for example, include information generated by the first UE, such as video information, audio information, control information, or other information. For example, the information may include video data having a frame rate associated with the non-integer periodicity. For example, if video data having a frame rate of 30 frames per second is to be transmitted, the non-integer periodicity of block 702 may be 33.33 ms.

Figure 8:
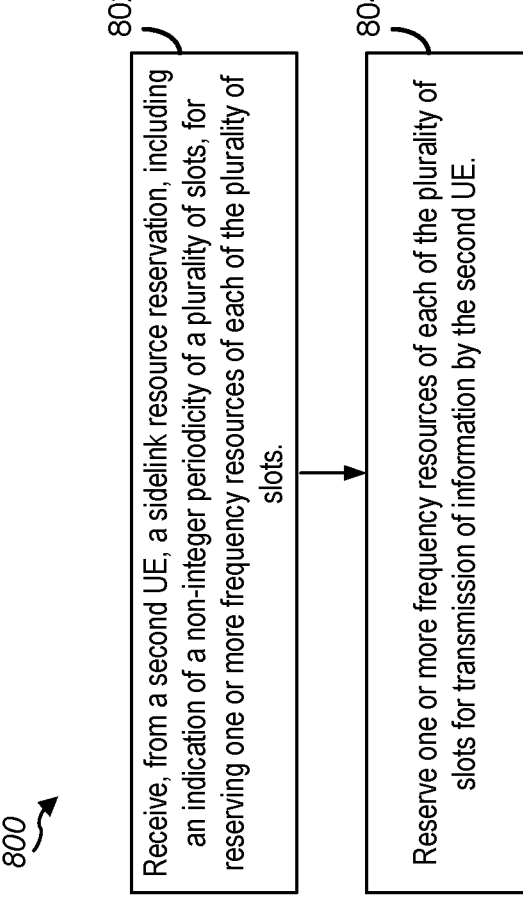
FIG. 8 is a flow diagram illustrating an example process that supports sidelink resource reservation enhancement according to one or more aspects.

FIG. 8 is a flow diagram illustrating an example process 800 that supports sidelink resource reservation enhancement according to one or more aspects. Operations of the process 800 may be performed by receiving UE, such as the UE 115 described above with reference to FIGS. 1-2, a UE 402 described above with reference to FIG. 4, or a UE as described with reference to FIG. 9. For example, example operations of the process 800 may enable the UE 402 to receive sidelink resource reservations and refrain from transmitting on sidelink resources at slots reserved by the sidelink resource reservations. The UE 402 may, for example, be a receiving UE, as described herein, such as headset for XR applications.

In block 802, the UE 402 may receive, from a second UE, such as a transmitting UE, a sidelink resource reservation including an indication of a non-integer periodicity of a plurality of slots, for reserving one or more frequency resources of each of the plurality of slots. The sidelink resource reservation may, for example, be a sidelink resource reservation as described with respect to block 702 of FIG. 7.

In block 804, the UE 402 may reserve one or more frequency resources of each of the plurality of slots for transmission of information by the second UE. For example, the UE 402 may refrain from transmitting on sidelink resources in the slots indicated by the sidelink resource reservation.

Figure 9:
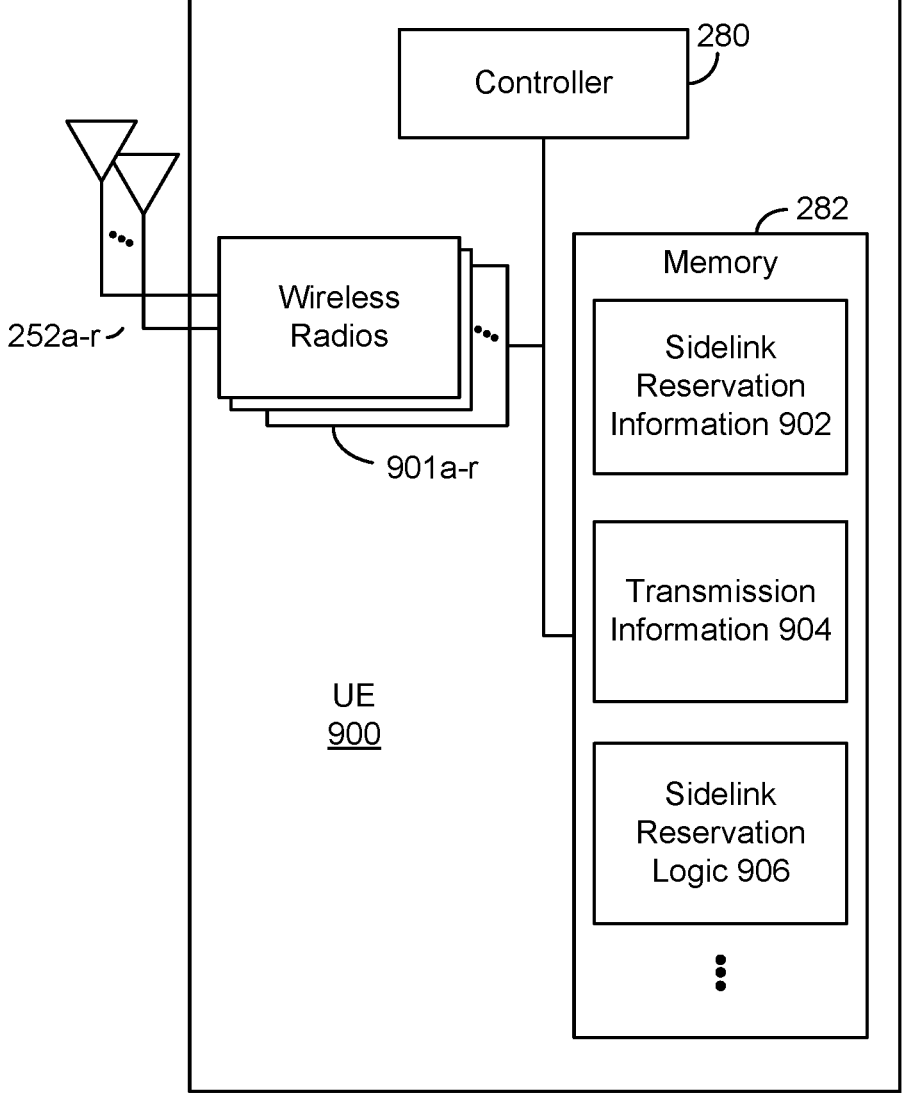
FIG. 9 is a block diagram of an example UE that supports sidelink resource reservation enhancement according to one or more aspects.

FIG. 9 is a block diagram of an example UE 900 that supports sidelink resource reservation enhancement according to one or more aspects. The UE 900 may be configured to perform operations, including the blocks of the process 700 described with reference to FIG. 7 and the process 800 described with reference to FIG. 8. In some implementations, the UE 900 includes the structure, hardware, and components shown and described with reference to the UE 115 of FIG. 2 or 4 or the UE 402 of FIG. 4. For example, the UE 900 includes the controller 280, which operates to execute logic or computer instructions stored in the memory 282, as well as controlling the components of the UE 900 that provide the features and functionality of the UE 900. The UE 900, under control of the controller 280, transmits and receives signals via wireless radios 901a-r and the antennas 252a-r. The wireless radios 901a-r include various components and hardware, as illustrated in FIG. 2 for the UE 115, including the modulator and demodulators 254a-r, the MIMO detector 256, the receive processor 258, the transmit processor 264, and the TX MIMO processor 266.

As shown, the memory 282 may include sidelink reservation information 902, transmission information 904, and sidelink reservation logic 906. The sidelink reservation information 902 may include sidelink reservation information as described with respect to sidelink reservation information 408 or 422 of FIG. 4. The transmission information may include transmission information as described with respect to transmission information 410 or 424 of FIG. 4. The UE 900 may receive signals from or transmit signals to one or more network entities, such as the base station 105 of FIGS. 1-2 another UE 115 of FIGS. 1-2 and 4, or a UE 402 of FIG. 4.

In some implementations, the UE 900 may be configured to perform the process 700 of FIG. 7 or the process 800 of FIG. 8. To illustrate, the UE 900 may execute, under control of the controller 280, the sidelink reservation logic 906 stored in the memory 282. The execution environment of the sidelink reservation logic 906 provides the functionality to perform at least the operations in blocks 702-704 or 802-804.

It is noted that one or more blocks (or operations) described with reference to FIGS. 7-8 may be combined with one or more blocks (or operations) described with reference to another of the figures. For example, one or more blocks (or operations) of FIG. 7 may be combined with one or more blocks (or operations) of FIG. 8. As another example, one or more blocks associated with FIGS. 7-8 may be combined with one or more blocks (or operations) associated with FIG. 1, 2, 3, or 4. Additionally, or alternatively, one or more operations described above with reference to FIG. 1, 2, 3, or 4 may be combined with one or more operations described with reference to FIG. 9.

In some aspects, techniques for enabling sidelink resource reservation enhancement may include additional aspects, such as any single aspect or any combination of aspects described below or in connection with one or more other processes or devices described elsewhere herein. In a first aspect, techniques for enabling sidelink resource reservation enhancement may include transmitting, by a first UE to a second UE, a sidelink resource reservation, including an indication of a non-integer periodicity of a plurality of slots, for reserving one or more frequency resources of each of the plurality of slots and transmitting information in one or more of the plurality of slots. In some examples, the techniques in the first aspect may be implemented in a method or process. In some other examples, the techniques of the first aspect may be implemented in a wireless communication device such as a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a second aspect, alone or in combination with the first aspect, the information comprises video data having a frame rate associated with the non-integer periodicity.

In a third aspect, alone or in combination with one or more of the first aspect or second aspect, the indication of the non-integer periodicity comprises an index corresponding to the non-integer periodicity.

In a fourth aspect, alone or in combination with one or more of the first aspect through third aspect, the indication of the non-integer periodicity comprises an indication of a non-uniform time domain pattern of the plurality of slots.

In a fifth aspect, alone or in combination with one or more of the first aspect through fourth aspect, the indication of the non-uniform time domain pattern of the plurality of slots comprises at least one of an indication of a time duration between a first slot and a second slot of the plurality of slots or an indication of a number of sequential slots between the first slot and the second slot.

In a sixth aspect, alone or in combination with one or more of the first aspect through fifth aspect, the indication of the non-integer periodicity comprises a first integer periodic reservation associated with the non-integer periodicity and a second integer periodic reservation associated with the non-integer periodicity.

In a seventh aspect, alone or in combination with one or more of the first aspect through the sixth aspect, the indication of the non-integer periodicity comprises a first integer periodic reservation and a first individual slot reservation, wherein the first integer periodic reservation and the first individual slot reservation are associated with the non-integer periodicity.

In an eighth aspect, alone or in combination with one or more of the first through the seventh aspect, the sidelink resource reservation comprises a slot offset indication indicating a position of a first slot in which the sidelink resource reservation is transmitted in a pattern of the plurality of slots.

In one or more aspects, techniques for supporting sidelink resource reservation enhancement may include additional aspects, such as any single aspect or any combination of aspects described below or in connection with one or more other processes or devices described elsewhere herein. In a ninth aspect, supporting sidelink resource reservation enhancement may include an apparatus, such as a first UE, configured to receive, from a second UE, a sidelink resource reservation, including an indication of a non-integer periodicity of a plurality of slots, for reserving one or more frequency resources of each of the plurality of slots and reserve one or more frequency resources of each of the plurality of slots for transmission of information by the second UE. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communications may include one or more operations described herein with reference to the apparatus.

In a tenth aspect, alone or in combination with the ninth aspect, reserving one or more frequency resources of each of the plurality of slots for transmission of information by the second UE comprises refraining from transmitting on the one or more frequency resources of each of the plurality of slots during each of the plurality of slots.

In an eleventh aspect, alone or in combination with the one or more of the ninth through tenth aspects, the indication of the non-integer periodicity comprises an indication of a non-uniform time domain pattern of the plurality of slots In a twelfth aspect, alone or in combination with one or more of the ninth aspect through eleventh aspects, the indication of the non-uniform time domain pattern of the plurality of slots comprises at least one of an indication of a time duration between a first slot and a second slot of the plurality of slots or an indication of a number of sequential slots between the first slot and the second slot.

In a thirteenth aspect, alone or in combination with one or more of the ninth aspect through the nineteenth twelfth aspects, the indication of the non-integer periodicity comprises a first integer periodic reservation associated with the non-integer periodicity and a second integer periodic reservation associated with the non-integer periodicity.

In a fourteenth aspect, alone or in combination with one or more of the ninth aspect through the thirteenth aspects, the indication of the non-integer periodicity comprises a first integer periodic reservation and a first individual slot reservation, wherein the first integer periodic reservation and the first individual slot reservation are associated with the non-integer periodicity.

In a fifteenth aspect, alone or in combination with one or more of the ninth aspect through the fourteenth aspects, the sidelink resource reservation comprises a slot offset indication indicating a position of a first slot in which the sidelink resource reservation is transmitted in a pattern of the plurality of slots.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-4 and 9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication performed by a first user equipment (UE), the method comprising:
   transmitting, to a second UE, a sidelink resource reservation, including an index corresponding to a non-integer periodicity of a plurality of slots, for reserving one or more frequency resources of each of the plurality of slots; and
   transmitting information in one or more of the plurality of slots.

2. The method of claim 1, wherein the information comprises video data having a frame rate associated with the non-integer periodicity.

3. The method of claim 1, wherein the index comprises an indication of a non-uniform time domain pattern of the plurality of slots.

4. The method of claim 3, wherein the indication of the non-uniform time domain pattern of the plurality of slots comprises at least one of:
   an indication of a time duration between a first slot and a second slot of the plurality of slots; or an indication of a number of sequential slots between the first slot and the second slot.

5. The method of claim 1, wherein the sidelink resource reservation comprises:
   a first integer periodic reservation associated with the non-integer periodicity; and
   a second integer periodic reservation associated with the non-integer periodicity.

6. The method of claim 1, wherein the sidelink resource reservation comprises a first integer periodic reservation and a first individual slot reservation, wherein the first integer periodic reservation and the first individual slot reservation are associated with the non-integer periodicity.

7. The method of claim 1, wherein the sidelink resource reservation comprises a slot offset indication indicating a position of a first slot in which the sidelink resource reservation is transmitted in a pattern of the plurality of slots.

8. A user equipment (UE) comprising:
   a memory; and
   at least one processor coupled with the memory and operable to:
   transmit, to a second UE, a sidelink resource reservation, including an index corresponding to a non-integer periodicity of a plurality of slots, for reserving one or more frequency resources of each of the plurality of slots; and
   transmit information in one or more of the plurality of slots.

9. The UE of claim 8, wherein the information comprises video data having a frame rate associated with the non-integer periodicity.

10. The UE of claim 8, wherein the index comprises an indication of a non-uniform time domain pattern of the plurality of slots.

11. The UE of claim 10, wherein the indication of the non-uniform time domain pattern of the plurality of slots comprises at least one of:
   an indication of a time duration between a first slot and a second slot of the plurality of slots; or
   an indication of a number of sequential slots between the first slot and the second slot.

12. The UE of claim 8, wherein the sidelink resource reservation comprises:
   a first integer periodic reservation associated with the non-integer periodicity; and
   a second integer periodic reservation associated with the non-integer periodicity.

13. The UE of claim 8, wherein the sidelink resource reservation comprises a first integer periodic reservation and a first individual slot reservation, wherein the first integer periodic reservation and the first individual slot reservation are associated with the non-integer periodicity.

14. The UE of claim 8, wherein the sidelink resource reservation comprises a slot offset indication indicating a position of a first slot in which the sidelink resource reservation is transmitted in a pattern of the plurality of slots.

15. A method for wireless communication performed by a first user equipment (UE), the method comprising:
   receiving, from a second UE, a sidelink resource reservation, including an index corresponding to a non-integer periodicity of a plurality of slots, for reserving one or more frequency resources of each of the plurality of slots; and
   reserving the one or more frequency resources of each of the plurality of slots for transmission of information by the second UE.

16. The method of claim 15, wherein reserving the one or more frequency resources of each of the plurality of slots for transmission of information by the second UE comprises refraining from transmitting on the one or more frequency resources of each of the plurality of slots during each of the plurality of slots.

17. The method of claim 15, wherein the index comprises an indication of a non-uniform time domain pattern of the plurality of slots.

18. The method of claim 17, wherein the indication of the non-uniform time domain pattern of the plurality of slots comprises at least one of:

An indication of a time duration between a first slot and a second slot of the plurality of slots; or an indication of a number of sequential slots between the first slot and the second slot.

19. The method of claim 15, wherein the sidelink resource reservation comprises:

a first integer periodic reservation associated with the non-integer periodicity; and a second integer periodic reservation associated with the non-integer periodicity.

20. The method of claim 15, wherein the sidelink resource reservation comprises a first integer periodic reservation and a first individual slot reservation, wherein the first integer periodic reservation and the first individual slot reservation are associated with the non-integer periodicity.

21. The method of claim 15, wherein the sidelink resource reservation comprises a slot offset indication indicating a position of a first slot in which the sidelink resource reservation is transmitted in a pattern of the plurality of slots.

22. A user equipment (UE) comprising:

a memory; and at least one processor coupled with the memory and operable to:

receive, from a second UE, a sidelink resource reservation, including an index corresponding to a non-integer periodicity of a plurality of slots, for reserving one or more frequency resources of each of the plurality of slots; and reserve the one or more frequency resources of each of the plurality of slots for transmission of information by the second UE.

23. The UE of claim 22, wherein to reserve the one or more frequency resources of each of the plurality of slots for transmission of information by the second UE, the at least one processor is operable to refrain from transmitting on the one or more frequency resources of each of the plurality of slots during each of the plurality of slots.

24. The UE of claim 22, wherein the index comprises an indication of a non-uniform time domain pattern of the plurality of slots.

25. The UE of claim 24, wherein the indication of the non-uniform time domain pattern of the plurality of slots comprises at least one of:

An indication of a time duration between a first slot and a second slot of the plurality of slots; or an indication of a number of sequential slots between the first slot and the second slot.

26. The UE of claim 22, wherein the sidelink resource reservation comprises:

a first integer periodic reservation associated with the non-integer periodicity; and a second integer periodic reservation associated with the non-integer periodicity.

27. The UE of claim 22, wherein the sidelink resource reservation comprises a first integer periodic reservation and a first individual slot reservation, wherein the first integer periodic reservation and the first individual slot reservation are associated with the non-integer periodicity.

28. The UE of claim 22, wherein the sidelink resource reservation comprises a slot offset indication indicating a position of a first slot in which the sidelink resource reservation is transmitted in a pattern of the plurality of slots.

* * * * *